(12) United States Patent
Tsutsumi et al.

(10) Patent No.: US 9,765,638 B2
(45) Date of Patent: Sep. 19, 2017

(54) ASSEMBLING METHOD OF SEAL STRUCTURE OF ROTARY MACHINE

(71) Applicant: MITSUBISHI HEAVY INDUSTRIES, LTD., Tokyo (JP)

(72) Inventors: Eiichi Tsutsumi, Tokyo (JP); Kenichi Arase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/163,382

(22) Filed: May 24, 2016

(65) Prior Publication Data
US 2016/0265376 A1 Sep. 15, 2016

Related U.S. Application Data

(63) Continuation-in-part of application No. 13/601,517, filed on Aug. 31, 2012, now Pat. No. 9,377,109.

(30) Foreign Application Priority Data

Jan. 12, 2012 (JP) ................................. 2012-004079

(51) Int. Cl.
*F16J 15/34* (2006.01)
*F01D 11/00* (2006.01)
*F01D 25/24* (2006.01)

(52) U.S. Cl.
CPC ......... *F01D 11/003* (2013.01); *F16J 15/3452* (2013.01); *F16J 15/3464* (2013.01);
(Continued)

(58) Field of Classification Search
CPC ............. F05D 2230/60; F05D 2230/64; F05D 2230/644; F05D 2230/68; F01D 11/003;
(Continued)

(56) References Cited

U.S. PATENT DOCUMENTS 2,867,458 A 1/1959 Kroekel
4,576,548 A 3/1986 Smed et al.
(Continued)

FOREIGN PATENT DOCUMENTS

EP 0571791 A1 12/1993
EP 1 348 898 A1 10/2003
(Continued)

OTHER PUBLICATIONS

International Search Report of PCT/JP2012/072157, mailing date of Nov. 13, 2012 with English translation.
(Continued)

*Primary Examiner* — Nicholas L Foster
(74) *Attorney, Agent, or Firm* — Westerman, Hattori, Daniels & Adrian, LLP (57) ABSTRACT

An assembling method of a seal structure of a rotary machine includes inserting a pin member into a through hole formed in a cylindrical member; threadably fitting the pin member into a pin installation hole of a segment; inserting a locking member into a first pin hole formed in the segment and a second pin hole formed in the pin member and fixing the pin member to the segment; arranging the segment in a groove part; inserting the cylindrical member; positioning the cylindrical member by causing the cylindrical member to slide in the axial direction; fixing the cylindrical member with respect to a seal mounting hole; causing the pin member to engage with a temporary joint member; moving an outer circumference side member and an inner circumference side member to approach to each other in the radial direction; and taking out the temporary joint member.

4 Claims, 7 Drawing Sheets

(52) U.S. Cl.
CPC .......... *F01D 11/005* (2013.01); *F01D 25/246* (2013.01); *F05D 2260/38* (2013.01)

(58) Field of Classification Search
CPC . F02C 7/28; F16J 15/34; F16J 15/3452; F16J 15/3436
See application file for complete search history.

(56) References Cited

U.S. PATENT DOCUMENTS

| | | | |
|---|---|---|---|
| 5,301,957 A | 4/1994 | Hwang et al. | |
| 5,370,403 A | 12/1994 | Sedy | |
| 6,145,840 A | 11/2000 | Pope | |
| 6,676,369 B2 | 1/2004 | Brauer et al. | |
| 6,719,296 B2 * | 4/2004 | Brauer | F01D 11/003 277/409 |
| 6,758,477 B2 * | 7/2004 | Brauer | F01D 11/02 277/379 |
| 8,714,557 B2 * | 5/2014 | Miller | F16J 15/3472 277/372 |
| 9,377,109 B2 * | 6/2016 | Tsutsumi | F01D 11/003 |
| 2003/0184022 A1 | 10/2003 | Brauer et al. | |
| 2004/0007823 A1 | 1/2004 | Brauer et al. | |
| 2011/0049809 A1 | 3/2011 | Garrison | |
| 2015/0167846 A1 | 6/2015 | Haynes et al. | |

FOREIGN PATENT DOCUMENTS

| | | |
|---|---|---|
| JP | 60-159306 A | 8/1985 |
| JP | 2002-161712 A | 6/2002 |
| JP | 2004-316509 A | 11/2004 |

OTHER PUBLICATIONS

Written Opinion dated Nov. 13, 2012, issued in counterpart International Application No. PCT/JP2012/072157, with English translation.
Office Action dated Dec. 3, 2014, issued in counterpart Chinese Patent Application No. 201280057479.1, with English Translation (14 pages).
Extended European Search Report dated Dec. 11, 2014, issued in counterpart European Patent Application No. 12865076.9 (7 pages).
Office Action dated Jul. 21, 2015 issued in U.S. Appl. No. 13/601,517 (23 pages).
Office Action dated Nov. 17, 2015 issued in U.S. Appl. No. 13/601,517 (8 pages).
Notice of Allowance and Fee(s) Due dated Mar. 1, 2016, issued in U.S. Appl. No. 13/601,517 (10 pages).
Decision to Grant a Patent dated Nov. 4, 2016, issued in counterpart European Patent Application No. 12865076.9. (2 pages).

* cited by examiner

ASSEMBLING METHOD OF SEAL STRUCTURE OF ROTARY MACHINE

CROSS-REFERENCE TO RELATED APPLICATIONS

This is a continuation-in-part application of U.S. application Ser. No. 13/601,517, filed on Aug. 31, 2012, which is based upon and claims the benefit of priority from Japanese Patent Application No. 2012-004079, filed Jan. 12, 2012. The contents of the aforementioned applications are incorporated herein in their entirety by reference.

BACKGROUND OF THE INVENTION

Field of the Invention

The present invention relates to an assembling method of a seal structure of a rotary machine.

Description of Related Art

Heretofore, there has been known a rotary machine such as a gas turbine, which has a casing and a rotating body which is rotated about the rotational axis in the interior of the casing. The casing of the gas turbine is provided with a casing (outer circumference side member), and a blade ring (inner circumference side member) which is arranged on the inner side of the casing in the radial direction that is orthogonal to the turbine shaft (hereunder, referred to as shaft).

In the gas turbine, depending on the intended purpose of cooling air, the space between the casing and the blade ring is separated in the axial direction by a ring-shaped seal body, forming a cavity.

As a seal structure of this type of a gas turbine, Patent Document 1 below discloses a seal structure in which a ring-shaped flange which is formed on an outer casing (outer circumference side member) and which projects radially inward and extends about the axis, and a ring-shaped flange which is formed on an inner casing (inner circumference side member) and which projects radially outward and extends about the axis, are arranged so as to be opposite to each other in the axial direction, and a seal body intervenes between these flanges.

In either one of these flanges, there is formed a ring-shaped groove part, which is recessed from the end surface that faces the other flange side and which extends about the axis, and the seal body is accommodated in this groove part so as to advance and retract while being able to come in contact with the other flange.

Moreover, there has been known a structure such as one disclosed in Patent Document 2 in which the circumferential surface of the seal body facing in the radial direction comes in contact with a shroud (outer circumference side member) to thereby provide sealing.

PRIOR ART DOCUMENTS

Patent Documents

[Patent Document 1] Japanese Unexamined Patent Application, First Publication No. 2002-161712

[Patent Document 2] Japanese Unexamined Patent Application, First Publication No. S60-159306

SUMMARY OF THE INVENTION

However, the conventional seal structure of a rotary machine and the gas turbine using the same described above have the following problem.

That is to say, in the case of the structure, as with the one disclosed in Patent Document 2, where the circumferential surface of the seal body facing in the radial direction is used to provide sealing, sealing is provided by the curved surfaces being in contact with each other. Therefore, there is a possibility that the level of sealing performance may be reduced due to thermal expansion and so forth at the time of operation.

On the other hand, according to the structure, as with the structure disclosed in Patent Document 1, in which the end surface of the seal body facing in the axial direction is used to provide sealing, sealing can be provided by the flat surfaces being in contact with each other. Therefore, it is likely to be free of influence of thermal expansion and so forth at the time of operation, and stable sealing performance is ensured. However, in this case, there is a possibility that gas (fluid) may infiltrate between the circumference of the seal body facing in the radial direction and the wall surface of the groove part facing in the radial direction, so that there is still room for improving the level of sealing performance.

The present invention takes into consideration the above circumstances, with an object of providing an assembling method of a seal structure of a rotary machine capable of stably increasing sealing performance.

In order to achieve the object above, the present invention proposes the following measures.

That is to say, the present invention is a seal structure of a rotary machine, which has a casing and a rotating body which is rotated about an axis in the interior of the casing, the casing comprising an outer circumference side member, and an inner circumference side member which is arranged on the inner side of the outer circumference side member in the radial direction that is orthogonal to the axis, wherein the outer circumference side member has a ring-shaped flange which projects inward in the radial direction and which extends about the axis, the inner circumference side member is of a ring shape which projects outward in the radial direction and which extends about the axis, and it has a flange which is opposite in the axial direction to the flange of the outer circumference side member, on either one of the flange of the outer circumference side member and the flange of the inner circumference side member, there is formed a ring-shaped groove part which is recessed from an end surface facing the other flange side and which extends about the axis, the groove part accommodates a ring-shaped seal body which advances and retracts so as to be able to come in contact with the other flange, and there are provided a first biasing device which biases the seal body toward the other flange side, and a second biasing device which biases the seal body toward a wall surface of the groove part facing in the radial direction.

Moreover, the gas turbine of the present invention uses the seal structure of a rotary machine described above.

According to the seal structure of a rotary machine of the present invention and the gas turbine using the same, the seal body, which is arranged in the groove part of one of the pair of flanges axially opposing to each other in the outer circumference side member and the inner circumference side member, comes in contact with the other flange from the end surface facing in the axial direction, to thereby perform sealing. That is to say, sealing can be performed by the flat surfaces of the seal body and the flange being in contact with each other, and therefore, it is likely to be free of influence of thermal expansion and so forth at the time of operation, and stable sealing performance is ensured.

In the gas turbine which uses this seal structure, the outer circumference side member is, for example, a casing, and the inner circumference side member is, for example, a blade ring or an exhaust diffuser.

Since this seal structure is provided with the first biasing device which biases the seal body toward the other flange side, even in the case where the distance between the pair of flanges increases or decreases due to thermal expansion, the seal body is prevented from moving away from the other flange so that contact between them is maintained stably.

Furthermore, the seal structure of a rotary machine of the present invention is provided with the second biasing device which biases the seal body toward the wall surface of the groove part facing in the radial direction, and therefore, it exhibits the following effect.

That is to say, the orientation of the above-mentioned first biasing device biasing the seal body is the direction of the seal body to move away from the bottom surface of the groove part (the surface of the groove part that faces the other flange side), and therefore, a gap is likely to occur between the seal body and the bottom surface of the groove part.

In the state where this type of gap is present, if a gap further occurs also in between the wall surface of the groove part facing in the radial direction and the seal body, the entire inner surface of the groove part and the seal body are separated from each other, and there is a possibility that gas (fluid) may enter through this gap and sealing performance may not be ensured.

Consequently, as practiced in the present invention, the second biasing device biases the seal body toward the radial direction to thereby ensure sealing performance between the seal body and the wall surface of the groove part. As a result, infiltration of gas is prevented, and the level of sealing performance is stably increased, combined with the effect mentioned above.

Moreover, in the seal structure of a rotary machine of the present invention, the seal body may include a plurality of segments arranged about the axis, and the first biasing device and the second biasing device may be provided respectively on these segments.

In this case, since the seal body includes a plurality of segments arranged about the axis, these segments tolerate relative movements of the outer circumference side member and the inner circumference side member in the axial direction or in the radial direction due to thermal expansion differential therebetween and pressure deformation, while gas leakage in the seal structure can be prevented.

Since the effect mentioned above can be obtained for each of these segments, even if thermal expansion differential due to temperature difference occurs in each portion along and about the axis of the seal body, the level of sealing performance can be stably increased.

Moreover, in the seal structure of a rotary machine of the present invention, the second biasing device may bias the seal body outward in the radial direction.

According to the present invention, even in the case where the seal body thermally expands, the biasing force of the second biasing device is likely to stably maintain the seal body being continuously in contact with the wall surface of the groove part. Therefore, the above effect can be stably obtained.

An assembling method of a seal structure of a rotary machine according to an aspect of the invention includes inserting a pin member into a through hole formed in a cylindrical member; threadably fitting the pin member into a pin installation hole of a segment; inserting a locking member into a first pin hole formed in the segment and a second pin hole formed in the pin member and fixing the pin member to the segment; arranging the segment in a groove part; inserting the cylindrical member; positioning the cylindrical member by causing the cylindrical member to slide in the axial direction; fixing the cylindrical member with respect to a seal mounting hole; causing the pin member to engage with a temporary joint member; moving an outer circumference side member and an inner circumference side member to approach to each other in the radial direction; and taking out the temporary joint member.

According to the assembling method described above, the segment, the pin member, and the cylindrical member are inserted into the groove part and the seal mounting hole in a state of being integrated via the locking member, and thus the position of the cylindrical member in the axial direction is accurately determined by the positioning pin. Therefore, the segment is accurately fixed to the groove part. Furthermore, since the assembly is performed in a state where the temporary joint member engages with the pin member, the assembly of the seal structure can be smoothly performed without interference of the segment fixed to the first flange and the second flange.

According to the seal structure of a rotary machine and the gas turbine which uses the same of the present invention, the level of sealing performance can be stably increased.

According to the assembling method of a seal structure of a rotary machine of the present invention, the assembly of the seal structure can be smoothly performed.

DETAILED DESCRIPTION OF THE INVENTION

Hereunder, an embodiment of the present invention is described, with reference to the drawings.

A gas turbine according to the embodiment of the present invention includes a compressor, a combustor, and a turbine. The gas turbine is configured so as to mix compressed air produced in the compressor with fuel and combust it in the combustor to produce high-temperature and high-pressure combustion gas. This combustion gas flows into the turbine, and thereby rotates the rotor of the turbine about the turbine shaft (shaft) to obtain rotational power.

In the present specification, the direction along the turbine shaft is referred to as the axial direction Da, the compressor side of the combustor along the axial direction Da is referred to as the upstream side, and the turbine side of the combustor is referred to as the downstream side. Moreover, the direction orthogonal to the axial direction Da is referred to as the radial direction Dr, and the direction of revolution about the axis is referred to as about the axis (or circumferential direction) Dc.

This gas turbine has a casing 30 and a rotating body such as the rotor which rotates about the axis Dc in the interior of the casing 30, and the seal structure of a rotary machine according to the present embodiment is used for this gas turbine (rotary machine).

Figure 1:
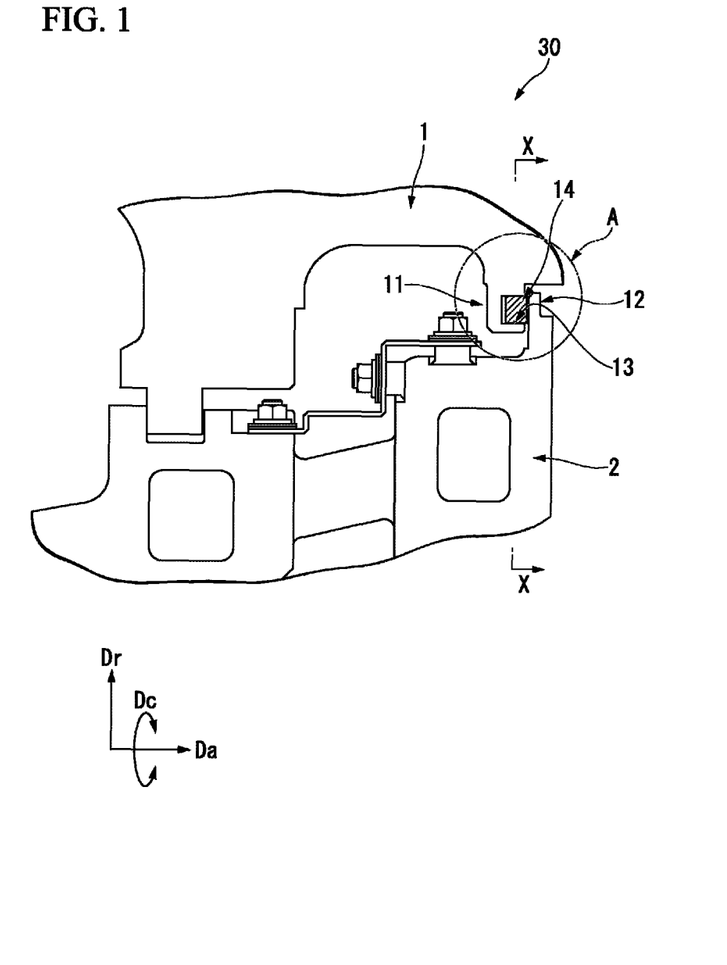
FIG. 1 is a longitudinal sectional view showing the vicinity of a seal structure of a gas turbine according to an embodiment of the present invention.

As shown in FIG. 1, the casing 30 is provided with a cylindrical outer circumference side member 1, and a cylindrical inner circumference side member 2 which is arranged on the radially inner side (lower side in FIG. 1) of the outer circumference side member 1.

In the example shown in the figure, a casing is shown as the outer circumference side member 1 and a blade ring is shown as the inner circumference side member 2. These casing and blade ring are, for example, divided into two as an upper half member and a lower half member in the circumferential direction Dc and form a ring shape (cylinder shape) as a whole by combining the upper half member and the lower half member in the perpendicular direction (up-down direction) via a horizontal flange (not illustrated) of the outer circumference side member, thereby forming the integrated outer circumference side member 1 and the inner circumference side member 2. An exhaust diffuser may be used as the inner circumference side member 2 instead of the blade ring.

The outer circumference side member 1 has a ring-shaped flange 11 which projects inward in the radial direction and which extends about the axis. Moreover, the inner circumference side member 2 is formed in a ring shape so as to project outward in the radial direction and extends about the axis. Furthermore, the inner circumference side member 2 has a flange 12 which is opposite to the flange 11 of the outer circumference side member 1 in the axial direction Da (left-right direction in FIG. 1).

In the example shown in the figure, the flange 12 of the inner circumference side member 2 is arranged so as to be opposite to the flange 11 of the outer circumference side member 1 from the downstream side in the axial direction Da (the right hand side in FIG. 1). Moreover, between these flanges 11 and 12, there is formed a small gap in the axial direction Da.

In either one of the flange 11 of the outer circumference side member 1 and the flange 12 of the inner circumference side member 2, there is formed a ring-shaped groove part 13 which is recessed from the end surface facing the other flange side and which extends about the axis, and in this groove part 13, there is accommodated a ring-shaped seal body 14 which advances and retracts while being able to come in contact with the other flange.

In the example shown in the figure, the groove part 13 is formed in the end surface of the flange 11 of the outer circumference side member 1 which faces the flange 12 side of the inner circumference side member 2 (that is, the downstream side in the axial direction Da), and in this groove part 13, there is accommodated the seal body 14, which advances and retracts toward and from the flange 12 of the inner circumference side member 2 while being able to come in contact therewith.

Figure 3:
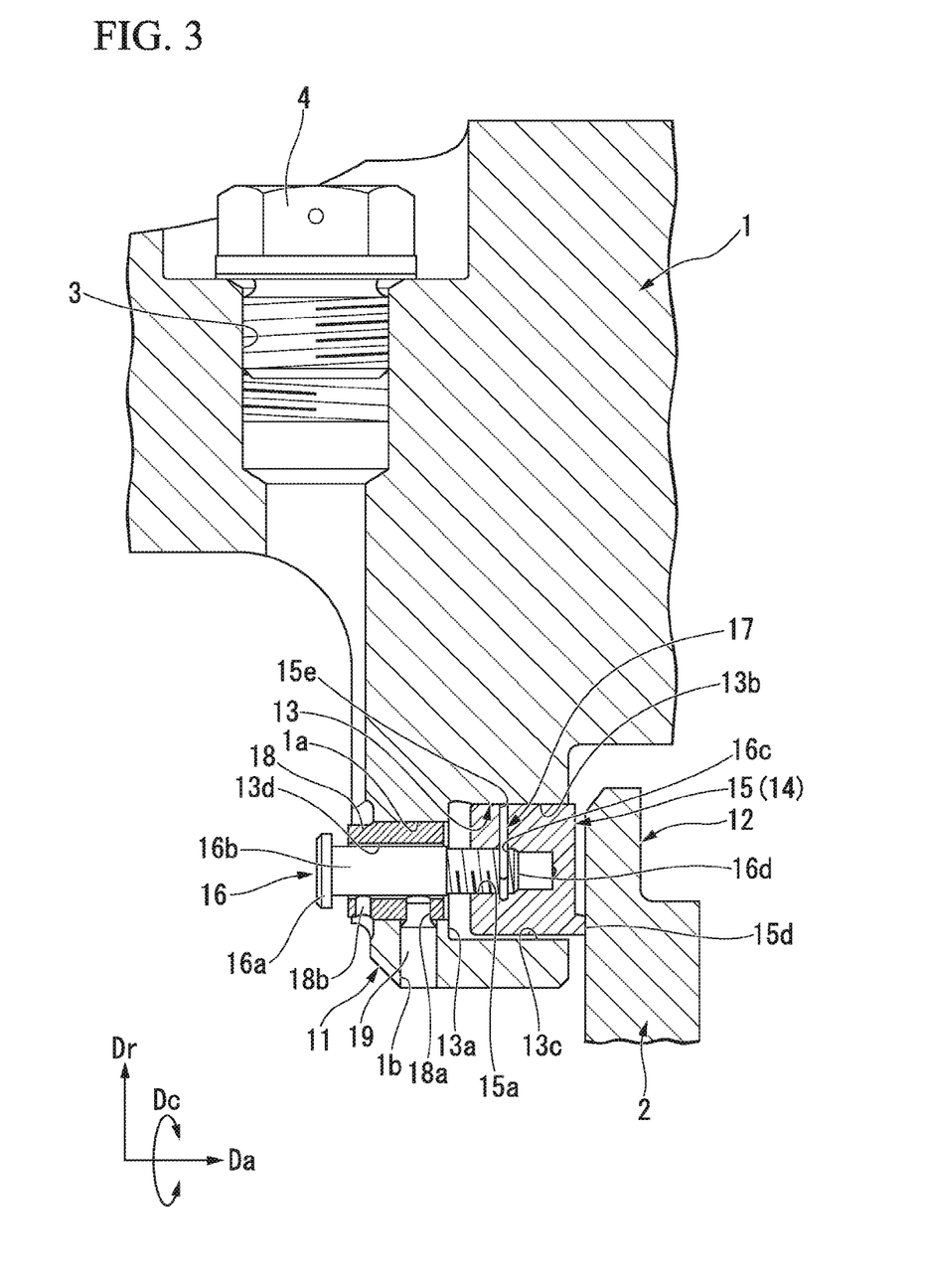
FIG. 3 is an enlarged view of the A part of FIG. 1.

As shown in FIG. 3, the groove part 13 has a bottom surface 13*a* facing in the axial direction Da, and a pair of wall surfaces 13*b* and 13*c* facing in the radial direction Dr. The bottom surface 13*a* faces the downstream side in the axial direction Da (the right hand side in FIG. 3), and it is formed in a flat surface shape perpendicular to the axis. Moreover, among the wall surfaces 13*b* and 13*c*, the wall surface 13*b* which is arranged on the outer side of the groove part 13 in the radial direction Dr and which faces the inner side in the radial direction Dr, is formed in a recessed and curved surface which is parallel with the axis and extends along the circumferential direction Dc. The wall surface 13*c* which is arranged on the inner side of the groove part 13 in the radial direction Dr and which faces the outer side in the radial direction Dr, is formed in a protruded and curved surface which is parallel with the axis and extends along the circumferential direction Dc.

Moreover, in the bottom surface 13*a* of the groove part 13, there are formed, at intervals along the circumferential direction Dc, a plurality of seal mounting holes 1*a* which respectively open in the surface facing the upstream side in the axial direction Da of the flange 11 (the left hand side in FIG. 3). These seal mounting holes 1*a* are formed to be capable of accommodating a bush 18 to be described later, and are respectively arranged in positions corresponding to a pin installation hole 15*a* of the seal body 14 to be described later.

In the longitudinal sectional view shown in FIG. 3 (the cross-sectional view including the axis), in the groove part 13, there is formed a rectangular hole which opens toward the downstream side in the axial direction Da.

Moreover, on the circumferential wall of the outer circumference side member 1, at positions corresponding to the outer side of the respective seal mounting holes 1*a* in the radial direction Dr, there are respectively formed screw holes 3 which pass through the circumferential wall in the radial direction Dr. The inner diameter of the screw hole 3 is a diameter which allows insertion of a temporary joint member 5 described later. In the screw hole 3, a screw member 4 is threadably fitted so as to be attachable and detachable to and from the screw hole 3.

Moreover, in the longitudinal sectional view shown in FIG. 3, the seal body 14 is of a rectangular shape, and can be accommodated in the groove part 13. Specifically, the length (thickness) of the seal body 14 along the axial direction Da is shorter than or equal to the length (groove depth) of the groove part 13 along the axial direction Da.

Furthermore, the length (width) of the seal body 14 along the radial direction Dr is shorter than the length (groove width) of the groove part 13 along the radial direction Dr.

The seal body 14 comprises a plurality of segments 15 arranged about the axis Dc.

Figure 2:
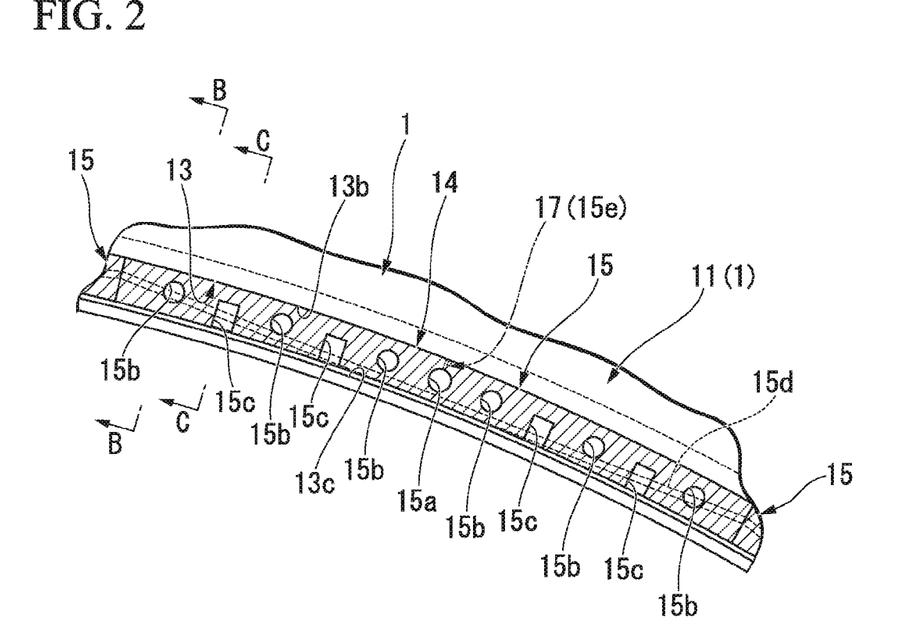
FIG. 2 is a frontal sectional view (X-X sectional view of FIG. 1) of the flange of the outer circumference side member being cut at the axially middle portion (the portion between both end parts of the flange along the turbine axial direction), and it is a diagram for describing segments of the seal body.

In the frontal sectional view shown in FIG. 2 (lateral sectional view, the section perpendicular to the axis), the segment 15 is of an arc shape, and by having the segments adjacent to each other in the circumferential direction Dc arranged in a manner such that the end surfaces thereof facing in the circumferential direction Dc come in close proximity to each other, the seal body 14 forms a ring shape as a whole. Between the segments 15 adjacent to each other in the circumferential direction Dc, there is preferably provided a small gap, taking into consideration thermal expansion at the time of operation.

Although not shown in particular in the figure, in the present embodiment, twenty four units of segment 15 are arranged at even intervals in the circumferential direction Dc.

As shown in FIG. 2 and FIG. 3, in the segment 15 of the seal body 14, in the end surface facing the bottom surface 13*a* side of the groove part 13, there is formed the pin installation hole 15*a* which opens to the end surface and which extends toward the downstream side in the axial direction Da. The pin installation hole 15*a* is not opened to the end surface of the segment 15 (the end surface that faces the downstream side in the axial direction Da, that is, the surface opposite to the flange 12) that faces the opposite side of the bottom surface 13*a* of the groove part 13.

In the following description, the end surface of the seal body 14 that faces the opposite side of the bottom surface 13*a* of the groove part 13 is referred to simply as the seal surface.

In FIG. 2, the pin installation hole 15*a* is arranged in the center part along the circumferential direction Dc of the segment 15. Moreover, as shown in FIG. 3, the pin installation hole 15*a* is female-threaded, and a male-threaded pin member 16 is threadably fitted therein. Reference symbol 17 in FIG. 3 denotes a locking member of the pin member 16. On the outer surface of the segment 15 in the radial direction Dr, at the position corresponding to the pin installation hole 15*a* of the segment 15 in the circumferential direction, a segment pin hole 15*e* (first pin hole) is formed toward the radial direction of the segment 15 and communicates with the pin installation hole 15*a*. Specifically, the position of the segment pin hole 15*e* formed on the segment 15 in the circumferential direction is regulated so that the central axis of the segment pin hole 15*e* extending in the radial direction Dr is orthogonal to the central axis of the pin installation hole 15*a* extending in the axial direction Da. The locking member 17 is capable of being inserted into the segment pin hole 15*e* in the radial direction Dr.

A pin member hole 16*c* (second pin hole) that is concentric with the segment pin hole 15*e* and passes through the pin member 16 in the radial direction when being threadably fitted in the pin installation hole 15*a* is formed in the pin member 16.

The locking member 17 is a thin cylindrical body provided with a slit-shaped groove in a longitudinal direction and having elastic characteristics. If the locking member 17 is inserted into the segment pin hole 15*e* and the pin member hole 16*c*, the outer diameter of the cylindrical body having spring properties spreads out so as to be in close contact with the segment pin hole 15*e* and the pin member hole 16*c*, and thus the locking member 17 is fixed with respect to the segment pin hole 15*e* and the pin member hole 16*c*. The locking member 17 is formed to be slightly shorter than the total length of the segment pin hole 15*e* and the pin member hole 16*c* so as not to project from the outer surface of the segment 15 in the radial direction Dr.

Moreover, in FIG. 2, the pin member 16 arranged in the pin installation hole 15*a*, a spring (first biasing device) 21 arranged within a first accommodating hole 15*b* described later, and a spring (second biasing device) 22 arranged within a second accommodating hole 15*c* are not shown.

In FIG. 3, the pin member 16 is inserted into the through hole 13*d* of the bush 18 to be described later of the flange 11 of the outer circumference side member 1 from the upstream side in the axial direction Da, and it extends toward the downstream side.

The outer diameter of the head part 16*a* of the pin member 16 is greater than the inner diameter of the through hole 13*d*, and moreover, the outer diameter of the shank 16*b* of the pin member 16 is smaller than the inner diameter of the through hole 13*d*.

The bush 18 that is a cylindrical member is arranged in the seal mounting hole 1*a* formed in the flange 11. The inner diameter of the seal mounting hole 1*a* is formed to be greater than the outer diameter of the head part 16*a* of the pin member 16 so that the head part 16*a* of the pin member 16 mounted to the segment 15 is capable of being inserted in the axial direction Da through the seal mounting hole 1*a*. Therefore, the bush 18 is a member acting as a spacer for fixing the pin member 16 to the outer circumference side member 1 through the seal mounting hole 1*a*. The through hole 13*d* passing through the bush 18 in the axial direction Da is formed on the inner side of the bush 18. The pin member 16 is able to be threadably fitted into the pin installation hole 15*a* of the segment 15 by passing through the through hole 13*d* of the bush 18. The pin member 16 is integrated with the segment 15 via the locking member 17 together with the bush 18, and is capable of being arranged in the groove part 13 via the bush 18. In addition, the pin member 16 is configured to be slidable in the through hole 13*d* of the bush 18 in the axial direction Da.

An outer circumference side member pin hole 1*b* (third pin hole) that communicates with the seal mounting hole 1*a* in the radial direction Dr is formed on the inner circumferential surface of the flange 11 of the outer circumference side member 1 so as to correspond to the position matching the center line of the seal mounting hole 1*a* in the axial direction Da. Specifically, the position of the outer circumference side member pin hole 1*b* formed on the flange 11 in the circumferential direction is regulated so that the center line (central axis) of the outer circumference side member pin hole 1*b* extending in the radial direction Dr is orthogonal to the center line (central axis) of the seal mounting hole 1*a* extending in the axial direction Da.

Furthermore, a bush pin hole 18*a* (fourth pin hole) that communicates with the through hole 13*d* is formed in the bush 18 so as to be concentric with the outer circumference side member pin hole 1*b* when being arranged in the seal mounting hole 1*a*.

A columnar positioning pin 19 is inserted in the radial direction Dr into each of the outer circumference side member pin hole 1*b* and the bush pin hole 18*a*, and is able to perform positioning of the bush 18 in the axial direction Da with respect to the outer circumference side member 1. The positioning pin 19 is formed such that the tip end part has a smaller diameter than that of the rear end part, and the connecting part between the tip end part and the rear end part is formed in a smoothly tapered shape. The inner diameters of the outer circumference side member pin hole 1*b* and the bush pin hole 18*a* are diameters which allow insertion of the tip end part of the positioning pin 19 which is formed to have a small diameter.

A position adjusting hole 18*b* that extends in the radial direction Dr to communicate with the through hole 13*d* is formed at a position that is on the upstream side of the bush pin hole 18*a* of the bush 18 in the axial direction Da and is in the vicinity of the upstream end of the bush 18 in the axial direction Da.

When the bush 18 is fixed to the flange 11 of the outer circumference side member 1, the position of the bush 18 in the axial direction Da is finely adjusted by inserting a bar shaped jig (not illustrated) into the position adjusting hole 18*b* and moving the bar shaped jig along the axial direction Da, and the positioning pin 19 is inserted into the outer circumference side member pin hole 1*b* and the bush pin hole 18a from the inner side in the radial direction Dr. Accordingly, the position of the bush 18 in the axial direction Da with respect to the flange 11 of the outer circumference side member 1 is determined. In addition, the positioning pin 19 is formed to have a length which does not allow the tip end of the positioning pin 19 to be in contact with the outer circumferential surface of the pin member 16 when the positioning pin 19 is inserted into the outer circumference side member pin hole 1b and the bush pin hole 18a.

Figure 4:
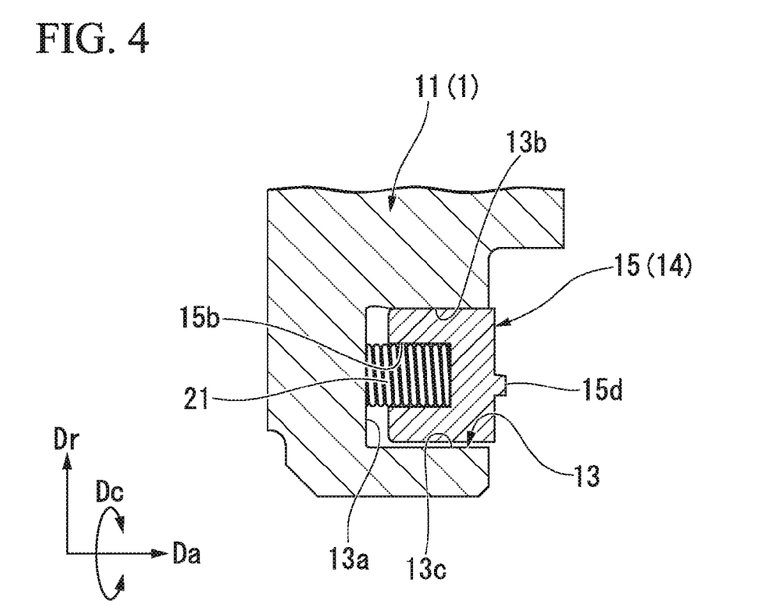
FIG. 4 is a B-B sectional view of FIG. 2.

As shown in FIG. 2 and FIG. 4, in the segment 15 of the seal body 14, a plurality of first accommodating holes 15b is formed at intervals in the end surface facing the bottom surface 13a side of the groove part 13 along the circumferential direction Dc.

As shown in FIG. 4, the first accommodating hole 15b opens toward the bottom surface 13a side of the groove part 13 in the segment 15, and it extends toward the seal surface (the surface facing the right hand side in FIG. 4) side. However, it is not opened to the seal surface.

Furthermore, as shown in FIG. 2, in the segment 15 of the seal body 14, a plurality of second accommodating holes 15c is formed at intervals in the inner circumferential surface facing the wall surface 13c side of the groove part 13 along the circumferential direction Dc. In the example shown in the figure, the first accommodating hole 15b and the second accommodating hole 15c are arranged in the segment 15 alternately along the circumferential direction Dc.

Figure 5:
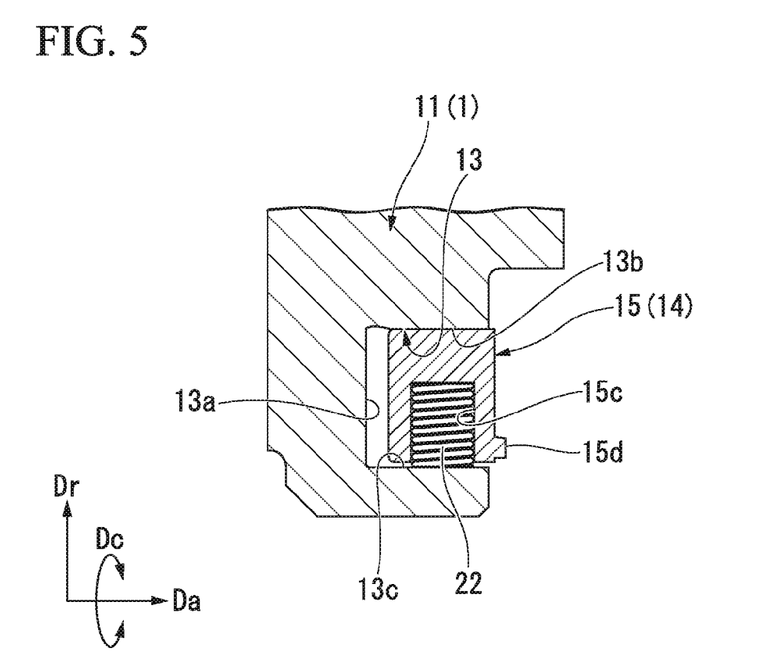
FIG. 5 is a C-C sectional view of FIG. 2.

As shown in FIG. 5, the second accommodating hole 15c opens toward the wall surface 13c side of the groove part 13 in the segment 15, and it extends toward the wall surface 13b side (the upper side in FIG. 5). However, it is not opened to the outer circumferential surface that faces the wall surface 13b side.

Moreover, in FIG. 2 through FIG. 5, on the seal surface of the segment 15 of the seal body 14, there is formed a rib 15d which projects from the seal surface and which extends in the circumferential direction Dc. The flat tip end surface of the rib 15d (the surface facing the downstream side in the axial direction Da) comes in contact with the flange 12.

In the frontal sectional view shown in FIG. 2, the rib 15d extends so that the position thereof in the radial direction Dr gradually changes from one end to the other end in the circumferential direction Dc in the segment 15. In the example shown in the figure, the rib 15d is of a linear shape. The position of the rib 15d in the radial direction Dr is arranged on the outermost side in the radial direction Dr at both end parts in the circumferential direction Dc, and is arranged on the innermost side in the radial direction Dr at the middle part in the circumferential direction Dc in the segment 15.

As shown in FIG. 4 and FIG. 5, this seal structure is provided with the spring (first biasing device) 21, which biases the seal body 14 toward the flange 12, and the spring (second biasing device) 22, which biases it toward either one of the wall surfaces 13b and 13c of the groove part 13 facing in the radial direction Dr.

The spring 21 and the spring 22 are formed with an elastic member, and in the example shown in the figure, a compression coil spring is used therefor.

The spring 21 and the spring 22 are respectively provided for the plurality of segments 15.

The spring 21 is accommodated in the first accommodating hole 15b of the segment 15.

Moreover, the spring 22 is accommodated in the second accommodating hole 15c of the segment 15.

In FIG. 4, the spring 21 expandably and contractably extends in the axial direction Da, and both end parts thereof are in contact with the bottom surface 13a of the groove part 13 and the bottom surface of the first accommodating hole 15b (the bottom surface facing the upstream side in the axial direction Da).

In FIG. 5, the spring 22 expandably and contractably extends in the radial direction Dr, and both end parts thereof are in contact with the wall surface 13c of the groove part 13 and the bottom surface of the second accommodating hole 15c (the bottom surface facing the inner side in the radial direction Dr). In the present embodiment, the spring 22 biases the seal body 14 toward the outer side in the radial direction Dr (that is to say, toward the wall surface 13b of the groove part 13).

Figure 6A:
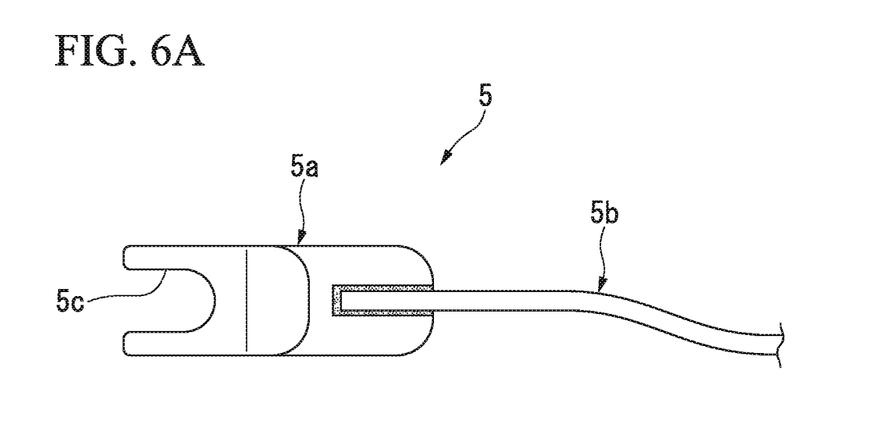
FIG. 6A is a front view of a temporary joint member used for assembling the seal structure.
Figure 6B:
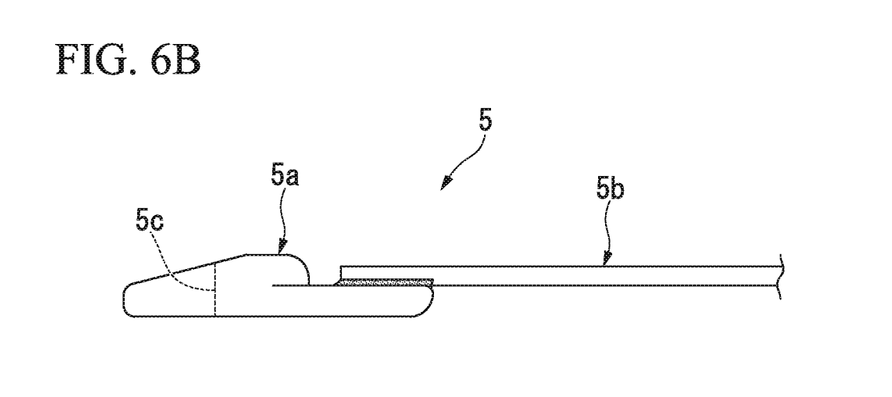
FIG. 6B is a side view of the temporary joint member used for assembling the seal structure.

Moreover, shown in FIG. 6A and FIG. 6B is a temporary joint member 5 used in the assembly of the seal structure of the present embodiment. The temporary joint member 5 is provided with an engaging part 5a which engages with the pin member 16, and a cord part 5b which is connected to the engaging part 5a.

In the front view shown in FIG. 6A, in the tip end part of the engaging part 5a, there is formed a U-shaped cutaway part 5c, and the opening width of the cutaway part 5c is greater than the shank 16b of the pin member 16 and smaller than the head part 16a. Moreover, in the side view shown in FIG. 6B, the tip end part of the engaging part 5a is formed in a tapered shape so that it successively becomes tapered with approach to the tip end side.

Furthermore, the cord part 5b is formed of a metal wire or the like with flexibility, and in the example shown in the figure, it is connected to the end part opposite to the tip end part of the engaging part 5a by means of brazing.

Figure 7:
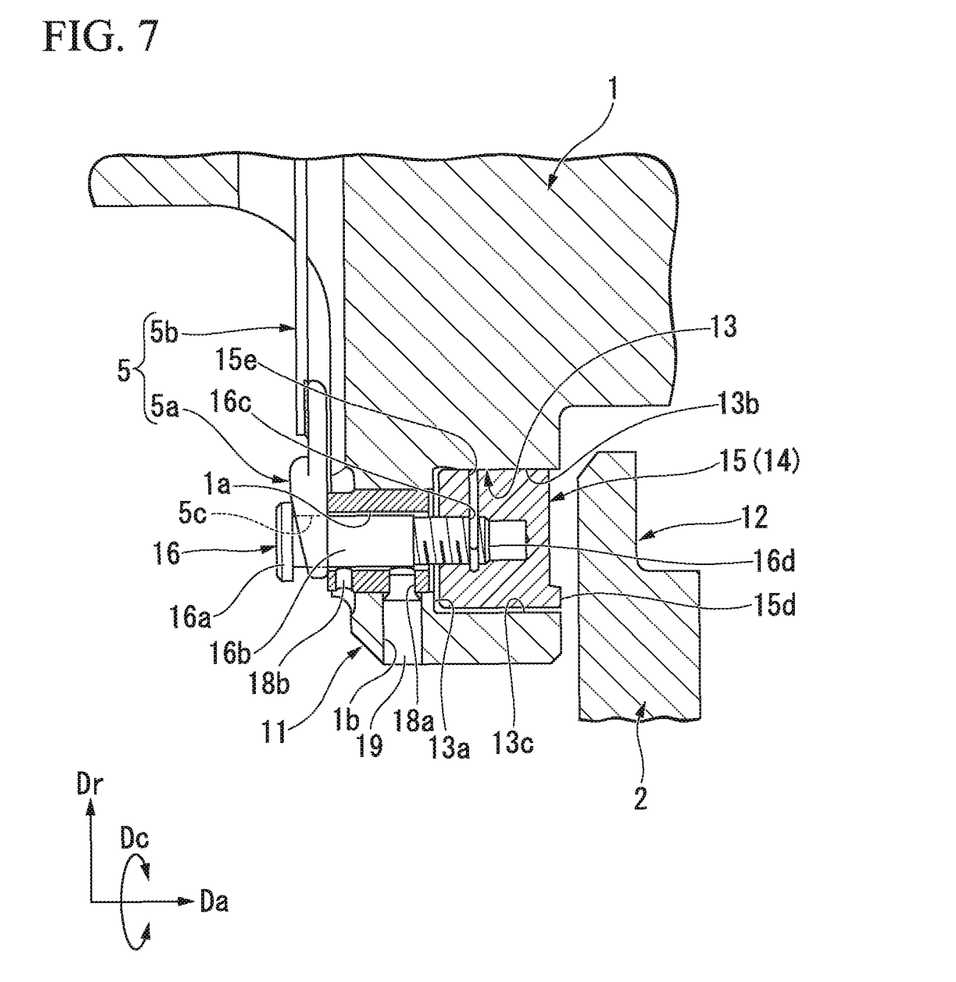
FIG. 7 is a diagram for describing the assembly of the seal structure.

Next, an assembling method and an assembling sequence of the seal structure mentioned above are described with reference to FIG. 3, FIG. 7, and FIG. 8.

Figure 8:
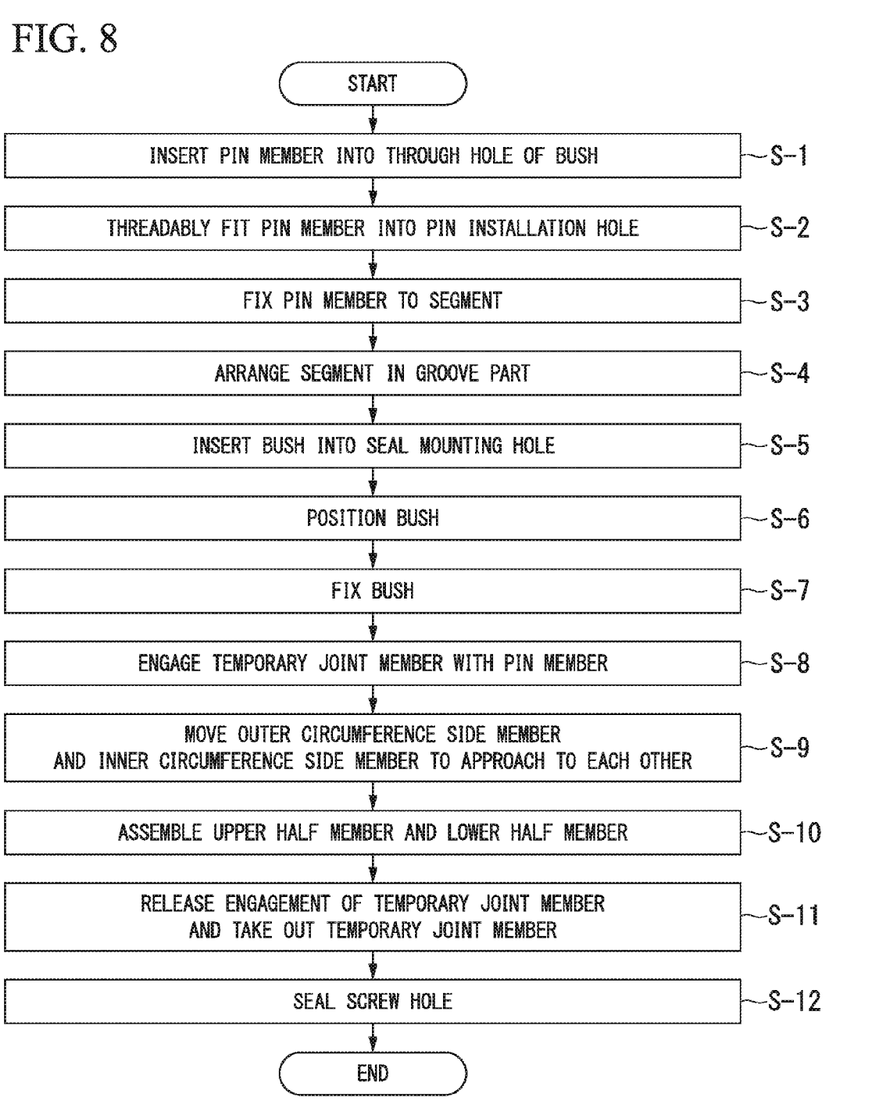
FIG. 8 is a diagram for illustrating an assembling sequence of the seal structure.

First, according to the sequence illustrated in FIG. 8, the segment 15, the pin member 16, and the bush 18 are assembled outside the casing 30. Specifically, the pin member 16 is inserted into the through hole 13d of the bush 18 from a tip end part 16d of the pin member 16 (S-1). At this time, the pin member 16 is inserted into the through hole 13d of the bush 18 so that the position adjusting hole 18b of the bush 18 is arranged on the head part 16a side of the pin member 16 (the upstream side of the axial direction Da, the left hand side in FIGS. 3 and 7), and the bush pin hole 18a is arranged on the tip end part 16d side of the pin member 16 (the downstream side of the axial direction Da, the right hand side in FIGS. 3 and 7).

Next, in a state where the bush 18 is installed in the pin member 16, the pin member 16 is threaded in the pin installation hole 15a from the male-threaded tip end part 16d side of the pin member 16, and thus the pin member 16 is threadably fitted into the pin installation hole 15a of the segment 15 (S-2).

Furthermore, the locking member 17 is inserted into the segment pin hole 15e after the positions of the segment pin hole 15e and the pin member hole 16c are aligned, and then the pin member 16 is fixed to the segment 15 (S-3). Accordingly, the position of the pin member 16 in the circumferential direction Dc and the axial direction Da with respect to the segment 15 is determined, and the segment 15, the pin member 16, and the bush 18 are integrated.

Next, the spring 21 (first biasing device) is inserted into the first accommodating hole 15b of the segment 15, and the spring 22 (second biasing device) is inserted into the second accommodating hole 15c of the segment 15. Then, in a state where the spring 21 and spring 22 are respectively held in the first accommodating hole 15b and the second accommodating hole 15c, the segment 15, the pin member 16, and the bush 18 which are integrated are arranged by being inserted into the groove part 13 from the downstream side of the axial direction Da (the right hand side in FIGS. 3 and 7) by the head part 16a of the pin member 16 as the head, that is, by causing the end surface on a side where the head part 16a of the pin member 16 and the pin installation hole 15a of the segment 15 are formed to face the seal mounting hole 1a (S-4).

Next, in a state where the segment 15 and the pin member 16 are held in the groove part 13, the bush 18 is inserted into the seal mounting hole 1a from the groove part 13 side toward the upstream side of the axial direction Da (S-5). At this time, the segment 15 is pushed back by the spring 21 to the downstream side of the axial direction Da (the right hand side in FIGS. 3 and 7) that is a side opposite to the insertion direction of the segment 15 while the segment 15 is inserted into the groove part 13 and the bush 18 is inserted into the seal mounting hole 1a. Therefore, it is necessary to perform insertion while pushing the surface where the rib 15d of the segment 15 is formed to the upstream side of the axial direction Da (the left hand side in FIGS. 3 and 7).

The position of the bush 18 in the axial direction Da with respect to the flange 11 of the outer circumference side member 1 (position in the axial direction Da within the seal mounting hole 1a) is finely adjusted by inserting the bar shaped jig (not illustrated) into the position adjusting hole 18b of the bush 18 and moving the bar shaped jig along the axial direction Da, and positioning is performed (S-6).

Next, the tip end part of the positioning pin 19 is inserted into the outer circumference side member pin hole 1b (third pin hole) of the outer circumference side member 1 and the bush pin hole 18a (fourth pin hole) of the bush 18, and then the bush 18 is fixed to the flange 11 (seal mounting hole 1a) of the outer circumference side member 1 (S-7). Accordingly, the position of the bush 18 in the axial direction Da with respect to the flange 11 of the outer circumference side member 1 is determined, and the bush 18 is fixed to the flange 11.

Next, in the state where the screw member 4 has been removed from the screw hole 3 of the outer circumference side member 1, the temporary joint member 5 is inserted into the screw hole 3. While the shank 16b of the pin member 16 is being accommodated in the tip end part (the cutaway part 5c) of the engaging part 5a of the temporary joint member 5, the tip end part is inserted in between the end surface of the flange 11 facing the upstream side in the axial direction Da (the left hand side in FIG. 7) and the head part 16a of the pin member 16, against the biasing force of the spring 21. In this manner, the temporary joint member 5 engages with the pin member 16 (S-8).

As a result, the segment 15 of the seal body 14 is drawn into the groove part 13, the seal surface of the segment 15 (specifically, the tip end surface of the rib 15d of the seal surface) is arranged so that it becomes flush with the end surface of the flange 11 facing the downstream side in the axial direction Da (the right hand side in FIG. 7), or it retracts to the upstream side in the axial direction Da (the left hand side in FIG. 7) from the end surface.

From this state, the outer circumference side member 1 and the inner circumference side member 2 are moved to approach to each other in the radial direction Dr (S-9). Accordingly, the flanges 11 and 12 are respectively arranged so as to be opposite to each other in the axial direction Da.

At this time, the seal body 14 is flush with the end surface of the flange 11 facing the downstream side in the axial direction Da or it has retracted from the end surface, and therefore, the outer side end part of the flange 12 in the radial direction Dr is prevented from coming into contact with and consequently damaging the seal body 14.

When the outer circumference side member 1 and the inner circumference side member 2 have been relatively positioned, the upper half member and the lower half member of the outer circumference side member 1 are assembled and the horizontal flange (not illustrated) is bolt-fastened, to thereby obtain integration of the outer circumference side member 1 (S-10).

Next, the cord part 5b of the temporary joint member 5 is pulled through the screw hole 3 from the outer side of the outer circumference side member 1, to thereby release the engagement between the engaging part 5a and the pin member 16. The temporary joint member 5 having been released from the engagement with the pin member 16 is taken out from the screw hole 3 to the outside of the outer circumference side member 1 (S-11).

At this time, since the tip end part of the engaging part 5a is of a tapered shape, when the temporary joint member 5 is pulled out, the biasing force of the spring 21 moves the pin member 16 gradually toward the downstream side in the axial direction Da. As a result, deformation and breakage caused by impact of the seal surface of the seal body 14 contacting the flange 12 with great force can be prevented, and sealing performance can be ensured at a high level of precision.

After the temporary joint member 5 having been released from the engagement with the pin member 16 is taken out from the screw hole 3 to the outside of the outer circumference side member 1, the screw member 4 is threaded into the screw hole 3 to seal it (S-12).

Even in the case where the seal body 14 cannot be viewed during the assembling process, as described in the present embodiment, the seal structure can be reliably assembled at a high level of precision according to this seal structure assembling method. When assembling the seal structure, if the temporary joint member 5 is in a state of engaging with the pin member 16, the segment 15 is held by being drawn into the groove part 13. Therefore, even if the upper half member as the outer circumference side member 1 to be mounted is hung down, the assembly can be smoothly performed without interference of the flange 12 of the inner circumference side member 2 and the rib 15d of the segment 15.

According to the seal structure of the present embodiment and the gas turbine using the same described above, the seal body 14, which is arranged in the groove part 13 of the flange 11 being one of the pair of flanges 11 and 12 opposing to each other in the axial direction Da in the outer circumference side member 1 and the inner circumference side member 2, comes in contact with the other flange 12 from the end surface (seal surface) facing in the axial direction Da, to thereby perform sealing. That is to say, sealing can be performed by the flat surfaces of the seal body 14 and the flange 12 being in contact with each other, and therefore, it is likely to be free of influence of thermal expansion and so forth at the time of operation, and stable sealing performance is ensured.

Since this seal structure is provided with the spring (first biasing device) 21 which biases the seal body 14 toward the other flange 12 side, even in the case where the distance between the pair of flanges 11 and 12 increases or decreases due to thermal expansion, the seal body 14 is prevented from moving away from the other flange 12 so that contact between them is maintained stably.

Furthermore, in the present embodiment, since there is provided the spring (second biasing device) 22, which biases the seal body 14 toward either one of the wall surfaces 13b and 13c of the groove part 13 facing in the radial direction Dr, the following effect can be achieved.

That is to say, the orientation of the above spring (first biasing device) 21 biasing the seal body 14 is a direction of moving the seal body 14 away from the bottom surface 13a of the groove part 13, and therefore, a gap is likely to occur between the seal body 14 and the bottom surface 13a of the groove part 13. In the state where this type of gap is present, if a gap further occurs also in between the wall surfaces 13b and 13c of the groove part 13 facing in the radial direction Dr and the seal body 14, the entire inner surface of the groove part 13 and the seal body 14 are separated from each other, and there is a possibility that gas may enter through this gap and sealing performance may not be ensured.

Consequently, as practiced in the present embodiment, the spring 22 biases the seal body 14 toward either one side in the radial direction Dr to thereby ensure sealing performance between the seal body 14 and the wall surface 13b or the wall surface 13c of the groove part 13. As a result, entering of gas is prevented, and the level of sealing performance is stably increased, combined with the effect mentioned above.

Specifically, in the present embodiment, the spring (second biasing device) 22 biases the seal body 14 toward the outer side in the radial direction Dr (that is to say, toward the wall surface 13b of the groove part 13), and therefore, the following effect is achieved.

That is to say, according to this configuration, even in the case where the seal body 14 thermally expands, the biasing force of the spring (second biasing device) 22 is likely to stably maintain the seal body 14 being continuously in contact with the wall surface 13b of the groove part 13. Therefore, the above effect can be stably obtained.

Moreover, since the seal body 14 includes a plurality of segments 15 arranged about the axis, these segments 15 tolerate relative movements of the outer circumference side member 1 and the inner circumference side member 2 in the axial direction Da or in the radial direction Dr due to thermal expansion differential therebetween and pressure deformation, while gas leakage in the seal structure can be prevented.

Since the effect mentioned above can be obtained for each of these segments 15, even if thermal expansion due to temperature difference occurs in each portion along and about the axis of the seal body 14, the level of sealing performance can be stably increased.

The present invention is not limited to the above embodiment, and various types of modifications may be made thereto without departing from the scope of the invention.

For example, in the above embodiment, a casing serving as an outer circumference side member 1 and a blade ring or an exhaust diffuser serving as an inner circumference side member 2 are used in the description. However, it is not limited to this. That is to say, as long as the outer circumference side member 1 and the inner circumference side member 2 are of a double ring-shaped body or a double cylinder-shaped body in which sealing performance in the axial direction Da is required with respect to the ring-shaped space or the cylindrical space formed therebetween, the present invention may be employed for portions other than those mentioned above. Moreover, in the present embodiment, a gas turbine serving as a rotary machine is used in the description. However, this may be a rotary machine other than a gas turbine.

Furthermore, in the embodiment above, the groove part 13 is formed in the end surface of the flange 11 of the outer circumference side member 1 which faces the flange 12 side of the inner circumference side member 2, and in this groove part 13, there is accommodated the seal 14, which advances and retracts toward and from the flange 12 of the inner circumference side member 2 while being able to come in contact therewith. However, it is not limited to thereto. That is to say, the groove part 13 may be formed in the end surface of the flange 12 of the inner circumference side member 2 that faces the flange 11 side of the outer circumference side member 1, and in this groove part 13, there may be accommodated the seal body 14 which advances and retracts toward and from the flange 11 of the outer circumference side member 1 while being able to come in contact therewith.

Moreover, in the above embodiment, the flange 12 of the inner circumference side member 2 is arranged so as to be opposite to the flange 11 of the outer circumference side member 1 from the downstream side in the axial direction Da.

However, inversely, the flange 11 of the outer circumference side member 1 may be arranged so as to be opposite to the flange 12 of the inner circumference side member 2 from the downstream side in the axial direction Da.

In addition, components described in the embodiment and the modified example (the supplemental description, etc) above of the present invention may be appropriately combined. Moreover, the above components may be substituted by commonly known components, without departing from the scope of the invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Outer circumference side member
1a Seal mounting hole
1b Outer circumference side member pin hole (third pin hole)
2 Inner circumference side member
3 Screw hole
4 Screw member
5 Temporary joint member
5b Cord part
11 Flange (one flange)
12 Flange (the other flange)
13 Groove part
13b, 13c Wall surface
13d Through hole
14 Seal body
15 Segment
15a Pin installation hole
15b First accommodating hole
15c Second accommodating hole
15e Segment pin hole (first pin hole)
16 Pin member
16a Head part
16b Shank
16c Pin member hole (second pin hole)

16d Tip end part
17 Locking member
18 Bush (cylindrical member)
18a Bush pin hole (fourth pin hole)
18b Position adjusting hole
19 Positioning pin
21 Spring (first biasing device)
22 Spring (second biasing)
30 Casing

What is claimed is:

1. An assembling method of a seal structure of a rotary machine,
wherein the rotary machine comprises:
a casing including an outer circumference side member and an inner circumference side member;
a rotating body which is rotated about an axis in the interior of the casing;
a first flange which is provided on the outer circumference side member, is formed in a ring shape so as to project inward in a radial direction that is orthogonal to the axis, and extend about the axis; and
a second flange which is provided on the inner circumference side member, is formed in a ring shape so as to project outward in the radial direction and extend about the axis, and is opposite in an axial direction to the flange of the outer circumference side member,
wherein the seal structure comprises:
a ring-shaped groove part which is provided on either one of the first flange and the second flange, is recessed from an end surface facing the other of the first flange and the second flange, and extends about the axis,
a ring-shaped segment which is able to be inserted into the groove part, includes a first biasing device that biases the segment in the axial direction so as to be able to come in contact with the other of the first flange and the second flange and a second biasing device that biases the segment in the radial direction, and is formed with a pin installation hole on an end surface that faces the axial direction,
a pin member which is capable of being threadably fitted in the pin installation hole,
a seal mounting hole that passes through the one of the first flange and the second flange in the axial direction and communicates with the groove part, and
a cylindrical member that is formed with a through hole which passes through the cylindrical member in the axial direction and into which the pin member is capable of being inserted,
the method comprising:
inserting the pin member into the through hole formed in the cylindrical member;
threadably fitting the pin member into the pin installation hole of the segment;
inserting a locking member into a first pin hole, which is formed on the segment at a position corresponding to the pin installation hole in a circumferential direction and is extending toward the radial direction of the segment, and a second pin hole, which is formed to pass through the pin member in the radial direction, and fixing the pin member to the segment;
inserting the first biasing device into a first accommodating hole of the segment which opens in the axial direction, inserting the second biasing device into a second accommodating hole of the segment which opens in the radial direction, and arranging the segment in the groove part so that an end surface where the pin installation hole is formed faces the seal mounting hole;
inserting the cylindrical member into the seal mounting hole from the groove part;
positioning the cylindrical member in the axial direction in the seal mounting hole by causing the cylindrical member to slide in the axial direction;
inserting a positioning pin into a third pin hole which is formed on an inner circumferential surface of the one of the first flange and the second flange and communicates with the seal mounting hole in the radial direction, inserting the positioning pin into a fourth pin hole which is formed in the cylindrical member in the radial direction, and fixing the cylindrical member with respect to the seal mounting hole;
causing the pin member to engage with a temporary joint member;
moving the outer circumference side member and the inner circumference side member to approach to each other in the radial direction; and
taking out the temporary joint member by releasing the engagement between the temporary joint member and the pin member.

2. The assembling method of a seal structure of a rotary machine according to claim 1,
wherein the outer circumference side member and the inner circumference side member are formed to be divided into an upper half member and a lower half member in the circumferential direction, and
wherein the method further comprises assembling the upper half member and the lower half member.

3. The assembling method of a seal structure of a rotary machine according to claim 1,
wherein the groove part is formed in the first flange.

4. The assembling method of a seal structure of a rotary machine according to claim 3,
wherein the outer circumference side member includes a screw hole that passes through the outer circumference side member in the radial direction, at a position corresponding to the seal mounting hole, and
wherein in the taking out of the temporary joint member, the temporary joint member is taken out from the screw hole.

* * * * *